United States Patent
Yates

Patent Number: 6,027,674
Date of Patent: Feb. 22, 2000

[54] RESILIENT CUSHION METHOD OF MANUFACTURE

[76] Inventor: Paul M. Yates, 5814 Briar Tree Dr., LaCanada, Calif. 91011

[21] Appl. No.: 09/089,746

[22] Filed: Jun. 3, 1998

[51] Int. Cl.[7] .................................................. B29C 35/02
[52] U.S. Cl. ............................................. 264/113; 264/122
[58] Field of Search ................................. 264/122, 113, 264/112

[56] References Cited

U.S. PATENT DOCUMENTS

| | | | |
|---|---|---|---|
| 5,366,678 | 11/1994 | Nomizo et al. | 264/122 |
| 5,378,296 | 1/1995 | Vesa | 264/122 |
| 5,456,873 | 10/1995 | Nomizo | 264/122 |
| 5,482,665 | 1/1996 | Gill | 264/113 |
| 5,494,627 | 2/1996 | Kargol et al. | 264/119 |
| 5,569,425 | 10/1996 | Gill et al. | 264/121 |
| 5,633,286 | 5/1997 | Chen | 524/474 |

*Primary Examiner*—Mary Lynn Theisen
*Attorney, Agent, or Firm*—Walter A. Hackler

[57] ABSTRACT

A method for making a resilient cushion includes providing a particulate polymer, discrete pieces of foam and a plasticizer. The polymer, foam pieces and plasticizer are mixed and disposed in a mold. The mold is heated to cause melting of the polymer without melting of the foam. After coating of the melted polymer, a heterogeneous resilient cushion is formed with gelated polymer surrounding the discrete foam pieces.

12 Claims, 1 Drawing Sheet

US 6,027,674

RESILIENT CUSHION METHOD OF MANUFACTURE

The present invention generally relates to resilient cushions and a method of manufacturing same. More particularly, the present invention provides for the manufacture of articles having controlled resilient properties through the combination of various gels and foams.

The properties of gel/foam combinations are important in a variety of manufactured items. For example, resilient cushion materials find application in numerous toys, bicycle seats, therapeutic hand exercising grips, shock absorbers, acoustical insulators, vibration dampers, wrappers, hand exercisers, crutch cushions, cervical pillows, bed wedge pillows, leg rest cushions, neck cushions, bed pads, elbow pads, elbow pads, wheelchair cushions, and many pads including floor pads, orthopedic shoe soles, brace cushions and numerous other objects of manufacture.

An article formed from the combination of gel and foam can have its resilient properties tailored through the use of foam of different sizes as well as resiliency depending upon the use and function of the resulting article.

As an example, foam pore size may have a significant influence on a composite resiliency. A discussion of gel foam combinations may be had from U.S. Pat. No. 5,633,286, which is incorporated herewith by the specific reference thereto, for describing the advantages of a gel/foam combination article.

SUMMARY OF INVENTION

A method for making a resilient cushion, which may take the form of any of the hereinabove recited articles, generally comprises the steps of providing a polymer in particulate form and discrete pieces of foam material. The particulate polymer and foam pieces are tumbled to provide a heterogeneous mixture.

A quantity of discrete pieces of foam material are provided in a selected size and thereafter the particulate polymer and foam pieces are tumbled to provide a heterogeneous mixture.

The heterogeneous mixture with plasticizer is introduced into a mold, which is thereafter heated, in order to cause melting of the polymer without melting of the foam. In this manner, the gelation of the melted polymer surrounds and encapsulates the foam particles and the heterogeneous mixture is not heated sufficiently to melt or degrade the foam pieces therein.

The melted polymer is allowed to gelate around the foam to cause a heterogeneous resilient cushion. Alternatively, the mixture may be passed through heated rollers which act as a continuous mold in order to form a sheet-like article or cushion.

Alternatively, a method for making a resilient cushion, which may take the form of any of the hereinabove recited articles, may generally comprise the steps of providing a polymer in particulate form and adding a plasticizing oil thereto in a mixer or the like. Plasticizing oil is added in a quantity less than that to agglomerate the polymer particulate so that the resulting mixture of plasticizing oil and polymer particulate remains in a discrete granular, flake or particle form.

A quantity of discrete pieces of foam material are provided in a selected size and thereafter the particulate polymer and foam pieces are tumbled to provide a heterogeneous mixture.

The heterogeneous mixture with plasticizer is introduced into a mold, which is thereafter heated, in order to cause melting of the polymer without melting of the foam. In this manner, the gelation of the melted polymer surrounds and encapsulates the foam particles and the heterogeneous mixture is not heated sufficiently to melt or degrade the foam pieces therein.

The melted polymer is allowed to gelate around the foam to cause a heterogeneous resilient cushion. Alternatively, the mixture may be passed through heated rollers which act as a continuous mold in order to form a sheet-like article or cushion.

More particularly, the step of providing particulate polymer may comprise the providing of a triblock copolymer elastomer in particulate form and the plasticizer may be added in the form of a plasticizing oil.

Still more particularly, the step of heating the mold may include heating the mold to a temperature of between 150° C. and about 200° C.

Preferably, the step of providing discrete pieces of foam material includes providing a closed cell foam.

In an alternative embodiment of the present invention, a first amount of polymer in particulate form is mixed with a first amount of plasticizer and disposed in a mold. A second amount of particulate polymer is provided along with a second amount of foam pieces which are mixed or tumbled therewith, along with a plasticizer.

The second amount of copolymer along with the foam pieces and plasticizer are added to the mold without substantial commingling with the first amount of particulate polymer. Thereafter, the mold is heated to cause melting of both amounts of the polymer without melting the foam. The copolymer is allowed to cool and gelate with the first amount of melted polymer gelling into a homogeneous gel in the second amount of melted polymer gelling around the foam pieces to form a heterogeneous resilient cushion.

In addition, the present invention also encompasses a resilient cushion which is made in accordance with the hereinabove recited steps.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
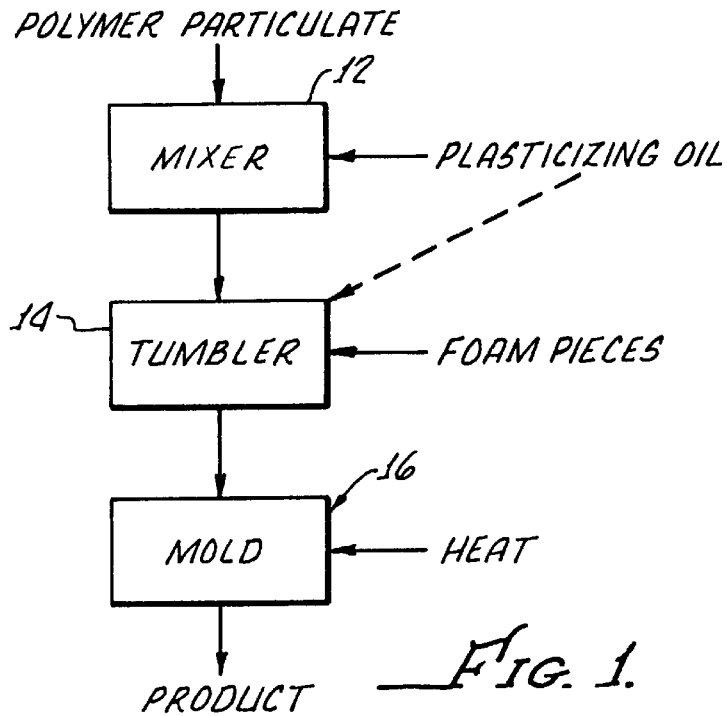
FIG. 1 is a block diagram in accordance with the method of the present invention.

Useful polymers in particulate form suitable for the present invention include triblock copolymers which are suitable in the forming of gel components. Such polymers can have a wide range of resilient properties when used with varying amounts of plasticizer, for example, plasticizer oil, as is well known in the art. Such triblock copolymers include:

SEBS gels; examples include (a) Kraton G 1651.G 1654X gels; (b) Kraton G 4600 gels; (c) Kraton G 4609 gels; (d) Tuftec H 1051 gels; (e) Tuftec H 1041 gels; (f) Tuftec H 1052 gels.

Gels made from blends (polyblends) of (a)–(f) with other polymers and copolymers include: SEBS-SBS gels; SEBS-SIS gels; SEBS-(SEP) gels; SEBS-(SB)n gels; SEBS-(SEB)n gels; SEBS-(SI)n gels; SEBS-(SI) multiarm gels; SEBS-branched copolymers gels; SEBS-star shaped copolymer gels; gels made from blends of (a)–(f) with other homopolymers include: SEBS/polystyrene gels; SEBS/polybutylene gels; SEBS/polyethylene gels; SEBS/polypropoylene gels.

Other suitable thermoplastic elastomers in blends suitable for making gels include SEP/SEBS oil gels, SEP/SEPS oil gels, SEP/SEPS/SEB oil gels, SEPS/SEBS/SEP oil gels, SEB/SEBS, EB-EP/SEBS, SEBS/EB, SEBS/EP, SEPS/SEB, etc.

The following commercial elastomers can be formed with oil and in combination with other polymers into suitable gels for use in making the gel components of the composites of the invention: Shell Kratons D1101, D1102, D1107, D1111, D1112, D1113X, D1116, D1117, D1118X, D1122X, D1125X D1133X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1705, G2721X, G7155, G7430, G7450, G7523X, G7528X, G7680, G7705, G7702X, G7720, G7722X, G7820, G7821X, G7827, G7890X, G7940; Kuraray's SEP/SEPS/SEEPS: Nos. 1001(SEP), 2002 (SEPS), 2003(SEPS), 2023(SEPS), 2043(SEPS), 2063 (SEPS), 2005(SEPS), 2006(SEPS), 1050(SEP), 2103 (SEPS), 2104(SEPS), 2105(SEPS), and 4055(SEEPS) manufactured by Kuraray Co., Ltd., wherein SEP is made from hydrogenated styrene isoprene di-block copolymer (SI).

SEPS is made from hydrogenated styrene isoprene triblock copolymer(SIS), and SEEPS is made from hydrogenated styrene isoprene/butadiene block copolymer or more specifically made from hydrogenated styrene block polymer with 2-methyl-1.3 butadiene and 1.3 butadiene.

The most preferred gels forming the composites of the invention comprise a high viscosity triblock copolymers which have the more general configuration A-B-A wherein each A is a crystalline polymer end block segment of polystyrene; and B is an elastomeric polymer center block segment of poly(ethylene-butylene). The poly(ethylene-butylene) and polystyrene portions are incompatible and form a two-phase system consisting of sub-micron domains of glassy polystyrene interconnected by flexible poly (ethylene-butylene) chains. These domains serve to crosslink and reinforce the structure. This physical elastomeric network structure is reversible, and heating the polymer above the softening point of polystyrene temporarily disrupt the structure, which can be restored by lowering the temperature. This also applies to high viscosity poly (styrene-ethylenepropylene-styrene) triblock copolymers.

Various mixtures of polymer may be used as taught in U.S. Pat. No. 5,633,286 hereinabove cited and incorporated herein by reference.

Plasticizers particularly preferred for use in practicing the present invention are well known in the art, and they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

Examples of representative commercially oils include Amoco® polybutenes, hydrogenated polybutenes and polybutenes with epoxide functionality at one end of the polybutene polymer. Examples of such polybutenes include L-14(320Mn), L-50(420Mn), L100(460Mn), H-15(560Mn), H-25(610Mn), H-35(660Mn), H50(750Mn), H-100 (920Mn), H-300 (1290Mn), L-14E (27–37 cst @ 100° F. Viscosity), H-300E (635–690 cst @ 210° F. Viscosity), Actipol E6 (365Mn), E16 (973Mn), E23 (1433Mn) and the like. Example of various commercially oils include: ARCO Prime (55, 70, 90, 200, 350, 400 and the like), Duraprime and Tufflo oils (6006, 6016, 6016M, 6026, 6036, 6056, 6206, etc), other white mineral oils include: Bayol, Bernol, American, Blandol, Drakeol, Ervol, Gloria, Kaydol, Litetek, Lyondell (Duraprime 55, 70, 90, 200, 350, 400, etc), Marcol, Parol, Peneteck, Primol, Protol, Sonrex, and the like.

Turning now to FIG. 1, there is shown a block diagram of the method in accordance with the present invention. Utilizing any of the hereinabove recited polymer particulates and plasticizers, a mixer 12 is provided for disbursing the plasticizing oil in the polymer particulates. It is important that the polymer particulate maintain its individual flake or pellet structure and accordingly, plasticizing oil should not be added in an amount to degrade the particular characteristics of the particle.

Thereafter, a tumbler 14 provides for mixing the polymer particulate with discrete foam pieces. Alternatively, as shown in dashed line in FIG. 1, the plasticizer oil may be introduced into the tumbler with the polymer particulate to provide a one-step tumbling/mixing action. The tumbling is continued until the foam pieces are entirely coated or surrounded by polymer particulate.

It should be appreciated that the characteristics of the resultant product are dependent upon this heterogeneous mixture of polymer and foam pieces and accordingly, the size of the foam particles may be from about ⅛ inch to about 1 inch.

The shape of foam pieces may be spherical, however, a preferred shape is cylindrical. This shape facilitates the cutting of the foam pieces from a flat piece of foam material. The resiliency of the foam material may be from about ½ to about 2 lbs/sq. ft. for hand cushions to from about 4 to about 6 lbs/sq. ft. for floor cushions or mats. This, of course, depends upon the size and shape of the final product, the thickness of the final product and the desired resilient properties.

Preferably, the foam is a closed cell plastic of common usage such as polyamides, polyimedes, polyesters, polyisocyanurates, polyisocyanates, polyurethanes, poly (vinyalcohol), for any suitable material.

Figure 2:
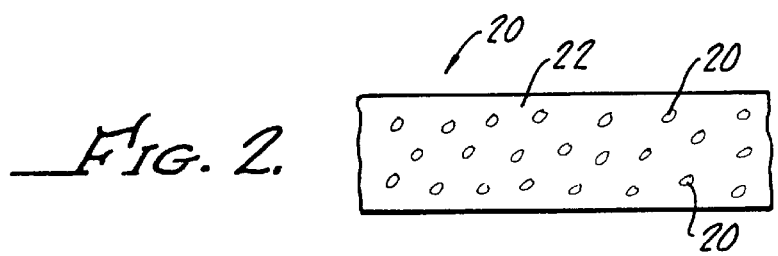
FIG. 2 is a representation of a resilient cushion made in accordance with the present invention which includes a heterogeneous cushion including discrete pieces of foam surrounded by a gelated polymer.
Figure 3:
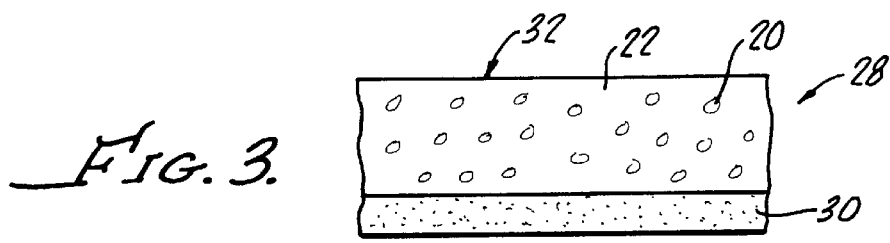
FIG. 3 is an alternative embodiment of the present invention in which a resilient cushion is formed, similar to that shown in FIG. 1, but with a gelatinous base on one side thereof.
Figure 4:
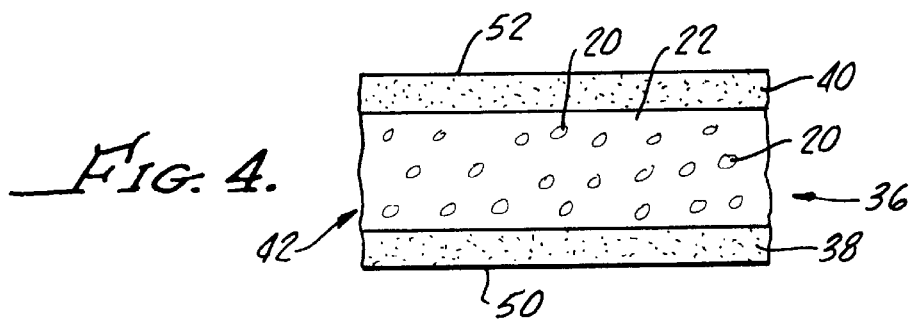
FIG. 4 is again an alternative embodiment of the present invention, similar to that shown in FIG. 3, but with a gelatinous top layer so that the foam/gel combination lies between distinct layers of gelate polymers.

Upon the homogeneous mixture, it is then passed to a mold 16, or the like, which is heated in order to cause melting of the polyparticulate around a discrete foam pieces 20, see FIGS. 2–4. Heating is preferably to a temperature of between about 150° C. to about 200° C.

It should also be appreciated that the mold 16, while indicated as a batch type mold, may be a continuous type mold for the production of sheet cushions or the like.

After cooling of the mold, the product 20, see FIG. 2, is produced, which includes gelated polymer 22 surrounding discrete pieces of foam 20. It should be appreciated that the product cushion 20 may be of any size or shape and accordingly the representation in FIG. 2 is primarily for showing the disbursement of foam particles 20 within a gelated polymer 22.

Turning now to FIG. 3, an alternative embodiment 28 made in accordance with the present invention includes a layer 30 of gelated polymer which may be disposed into the mold 16 prior to the addition of the heterogeneous mixture of polymer 22 and foam pieces 20. In this configuration, the layer 30 provides a firm support for an overlying cushion 32 of gelated polymer 22 and foam pieces 20.

Since the resiliency, or rigidity of the polymer may be controlled through the use of plasticizing oil, the layer 30 may be rigid, or may be flexible, depending upon the end use of the product 28.

A further embodiment 36 of the present invention is shown in FIG. 4 in which there are two layers 38, 40 of polymer with a heterogeneous layer 42 of gel 22 and discrete pieces of foam 20. In this configuration, the product 36 may be used as a shock absorber, or depending upon the thickness of the layers 38, 40, it may be used as a cushion having abrasion resistant of surfaces 50, 52, because of the superior strength provided by the polymer layers 38, 40.

It is important to appreciate that the present invention may be distinguished over the prior art and that it utilizes a closed cell foam and a process of which provides for melting and gelating the polymer around the foam without melting or physical deterioration of the foam pieces.

Although there has been hereinabove described a particular arrangement of making a resilient cushion in accordance with the present invention, for the purpose of illustrating the manner in which the invention may be used to advantage, it should be appreciated that the invention is not limited thereto.

Accordingly, any and all modifications, which may occur to those skilled in the art, should be considered to be within the scope of the present invention as defined in the appended claims.

What is claimed is:

1. A method for making a resilient cushion, said method comprising the steps of:

providing a polymer in particulate form;

providing discrete pieces of foam material;

tumbling the particulate polymer and foam pieces to provide a heterogeneous mixture;

disposing the heterogeneous mixture with plasticizer into a mold;

heating the mold to cause melting of the polymer without melting of the foam; and allowing the melted polymer to gelate around the foam pieces to form a heterogeneous resilient cushion.

2. The method according to claim 1 wherein the step of providing particulate polymer comprises providing a tri-block copolymer elastomer in particulate form and the method further comprises the step of adding a plasticizer to the heterogeneous mixture.

3. The method according to claim 2 wherein the step of adding a plasticizer comprises adding a plasticizing oil.

4. The method according to claim 3 wherein the step of providing discrete pieces of foam material includes providing a closed cell foam.

5. A method for making a resilient cushion, said method comprising the steps of:

providing a polymer in particulate form;

providing discrete pieces of foam material;

tumbling the particulate polymer and foam pieces to coat the foam pieces with particulate polymer;

disposing the coated pieces of foam into a mold;

heating the mold to cause melting of the polymer without melting of the foam; and allowing the melted polymer to gelate around the foam pieces to form a resilient cushion.

6. The method according to claim 5, wherein the step of providing particulate polymer comprises providing a tri-block copolymer elastomer in particulate form and the method further comprises the step of adding a plasticizer to the coated pieces of foam.

7. The method according to claim 6 wherein the step of adding a plasticizer comprises adding a plasticizing oil.

8. The method according to claim 7 wherein the step of providing discrete pieces of foam material includes providing a closed cell foam.

9. A method for making a resilient cushion, said method comprising the steps of:

providing a first amount polymer in particulate form;

mixing the first amount of particulate polymer with a plasticizer;

providing a second amount of polymer in particulate form;

providing discrete pieces of foam material;

tumbling the second amount of particulate polymer and foam pieces to provide a heterogeneous mixture;

disposing the first amount of particulate polymer with plasticizer into a mold;

disposing the heterogeneous mixture into the mold without substantial commingling with the first amount of particulate polymer;

heating the mold to cause melting of both amounts of polymer without melting of the foam;

allowing both amounts of melted polymer to gelate, the first amount of melted polymer gelating into a homogeneous gel, the second amount of melted polymer gelation around the foam pieces to form a heterogeneous resilient cushion having a homogeneous gel on at least a portion thereto.

10. The method according to claim 9 wherein the steps of providing particulate polymer comprises providing a tri-block copolymer elastomer in particulate form and method further comprises the steps of adding a plasticizer to the heterogeneous mixture.

11. The method according to claim 10 wherein the step of adding a plasticizer comprises adding a plasticizing oil.

12. The method according to claim 11 wherein the step of providing discrete pieces of foam material includes providing a closed cell foam.

\* \* \* \* \*